US007101513B2

(12) United States Patent

Naka et al.

(10) Patent No.: US 7,101,513 B2
(45) Date of Patent: Sep. 5, 2006

(54) METHOD OF STARTING AND STOPPING METHANOL REFORMING APPARATUS AND APPARATUS FOR SUPPLYING FUEL TO SAID APPARATUS

(75) Inventors: Takahiro Naka, Wako (JP); Hideaki Sumi, Wako (JP); Masataka Furuyama, Wako (JP); Shoji Isobe, Wako (JP); Yasushi Hiramatsu, Niigata (JP); Mikio Yoneoka, Niigata (JP)

(73) Assignees: Honda Giken Kogyo Kabushiki Kaisha, Tokyo (JP); Mitsubishi Gas Chemical Co., Inc., Tokyo (JP)

( * ) Notice: Subject to any disclaimer, the term of this patent is extended or adjusted under 35 U.S.C. 154(b) by 511 days.

(21) Appl. No.: 09/912,306

(22) Filed: Jul. 26, 2001

(65) Prior Publication Data

US 2002/0030175 A1 Mar. 14, 2002

Related U.S. Application Data

(62) Division of application No. 09/725,808, filed on Nov. 30, 2000, now Pat. No. 6,290,877.

(30) Foreign Application Priority Data

Nov. 30, 1999 (JP) ................................ 11-341442
Nov. 30, 1999 (JP) ................................ 11-341443
Nov. 30, 1999 (JP) ................................ 11-341444

(51) Int. Cl.
*B32B 5/02* (2006.01)
*B01J 3/00* (2006.01)

(52) U.S. Cl. ...................... 422/110; 422/105; 422/108; 48/127.9

(58) Field of Classification Search .................... 48/61, 48/197 R; 423/648.1, 247; 261/79.2
See application file for complete search history.

(56) References Cited

U.S. PATENT DOCUMENTS 4,282,835 A * 8/1981 Peterson et al. ............ 123/1 A
4,392,869 A * 7/1983 Marion et al. ............ 48/197 R (Continued)

FOREIGN PATENT DOCUMENTS

DE 689 05 319 T 2 12/1989

(Continued)

OTHER PUBLICATIONS

English translation of Japanese Office Action mailed Aug. 16, 2005.

*Primary Examiner*—Glenn Caldarola
*Assistant Examiner*—Tom P. Duong
(74) *Attorney, Agent, or Firm*—Arent Fox PLLC

(57) ABSTRACT

A fuel supplying apparatus for maintaining a stable supply of a mixed water-methanol solution while preventing water from freezing in a cold climate, and for immediately supplying a mixed water-methanol gas that has a composition which is outside of the high-rate reaction region during the starting/stopping operation of the reformer when the control tends to be unstable. The methanol reforming apparatus that generates a hydrogen-rich gas by reacting a mixed gas of water, methanol and air on a catalyst is supplied with the fuel from a fuel supplying apparatus comprising a mixed water-methanol solution tank wherein the molar ratio of water and methanol used for reforming is controlled to a predetermined value, a mixed water-methanol solution tank wherein the molar ratio of water and methanol is controlled to 4.6 or higher, and a switching means that switches the mixed water-methanol solution tank used as a fuel source according to the conditions of operation of the methanol reforming apparatus.

12 Claims, 6 Drawing Sheets

U.S. PATENT DOCUMENTS

| | | | | |
|---|---|---|---|---|
| 4,394,137 | A * | 7/1983 | Marion et al. | 48/197 R |
| 4,424,771 | A * | 1/1984 | Lovercheck | 123/3 |
| 4,670,359 | A * | 6/1987 | Beshty et al. | 429/17 |
| 4,946,667 | A * | 8/1990 | Beshty | 423/648.1 |
| 5,648,182 | A * | 7/1997 | Hara et al. | 429/20 |
| 6,165,633 | A * | 12/2000 | Negishi | 429/17 |
| 6,536,748 | B1 * | 3/2003 | Tachihara et al. | 261/79.2 |

FOREIGN PATENT DOCUMENTS

| | | |
|---|---|---|
| DE | 694 07 536 T 2 | 10/1994 |
| DE | 698 04 375 T 2 | 6/1998 |
| EP | 0 376 419 B1 | 3/1993 |
| EP | 0 650 950 B1 | 12/1997 |
| EP | 0 974 550 A1 | 1/2000 |
| EP | 1 077 081 A2 | 2/2001 |
| EP | 0 882 670 B1 | 3/2002 |
| JP | H06-256001 | 9/1994 |
| JP | H06-279001 | 10/1994 |

* cited by examiner

AUTOMOBILE ACCESSORIES, AIR CONDITIONER, ELECTRIC POWER STEERING, LIGHTS, VARIOUS RESISTIVE LOADS
Batt 12V
DC/DC 12V
DC/DC
ENERGY STORAGE (Batt or Cap)
EV DRIVE MOTOR
ACCELERATOR PEDAL
PROX
EXHAUST
P
10
21
22
23
24
25
26a
26b
27a
27b
28
31, 32
33
34
36
41
42
43
45
51
52
53
54
55
56
61
62
63
64
65a
65b
66

METHOD OF STARTING AND STOPPING METHANOL REFORMING APPARATUS AND APPARATUS FOR SUPPLYING FUEL TO SAID APPARATUS

This application is a division of U.S. application Ser. No. 09/725,808 filed on Nov. 30, 2000, now U.S. Pat. No. 6,290,877.

BACKGROUND OF THE INVENTION

1. Field of the Invention

The present invention relates to method of starting and stopping a methanol reforming apparatus that generates a hydrogen enriched gas from water and methanol, and an apparatus for supplying a fuel to said methanol reforming apparatus.

2. Description of Related Art

Fuel cells have been developed as a means for driving low-pollution vehicles and for supplying electric power to vehicles.

Hydrogen in the form of a compressed hydrogen gas or liquid hydrogen is convenient as the energy source for the fuel cell, but there are problems regarding the ease of handling. Thus there is a demand for a hydrogen supply apparatus which is very easy to handle.

Recently, technologies for preparing hydrogen enriched gas by reforming alcohol or hydrocarbons using a catalyst have been intensively studied and developed, and various catalysts and reaction apparatuses have been invented.

An example of the reaction apparatus is a methanol reforming apparatus (hereinafter referred to as "reformer") 1 shown in FIG. 6. For supplying fuel to the reformer 1, methods are known such as separately providing a water tank and a methanol tank or separately providing a mixed water-methanol solution tank 2 and a methanol tank 3 in order to prevent water from freezing in cold climates, as disclosed in Japanese Patent Application, First Publication No. Hei 8-91804, wherein water and methanol are delivered from the two tanks in a liquid state to an evaporator 4 to produce a mixed water-methanol gas which is then supplied to the reformer 1.

However, when methanol, which has a low flash point and a low ignition point, is reformed, particularly when employing the autothermal reaction process, wherein a partial oxidization reaction and steam reforming reaction are carried out at the same time, methanol vapor and air coexist on a catalyst that has a high temperature, and therefore the reforming process must be carried out in a strictly controlled system to prevent the reaction from proceeding at an excessively high rate.

Specifically, the mixing ratio of water, methanol and air must not be within a range in which the reaction proceeds at an excessively high rate (hereinafter this range is referred to as "high-rate reaction region"), and the amounts of these materials to be introduced must be strictly controlled.

Before starting the operation of the reformer, on the other hand, the reformer must be warmed and particularly the catalyst layer must be warmed by a heating means until the catalyst becomes active. Hot air or electric heating have been normally used for this purpose.

While water, methanol and air are introduced into the catalyst after the warm-up operation, it is very difficult to control the mixing ratio of the three components so as to avoid the high-rate reaction region. To get around this difficulty, such measures have been taken in the prior art as changing the order of introducing the materials, for example, introducing air after water and methanol have been introduced.

In practice, such measures involve the problems that it takes a long time to start the operation or that special means are required to warm up the catalyst.

To prevent water from freezing in a cold climate, it is more advantageous to provide a mixed water-methanol solution tank 2 than to separately provide a water tank and a methanol tank. Actually, however, it is a common practice to provide a methanol tank 3 in addition to the mixed water-methanol solution tank 2 and to control the mixing ratio using the methanol tank 3 in order to obtain the desired ratio of water and methanol.

As a consequence, there was a problem in that a mixed water-methanol gas having a ratio outside of the high-rate reaction region cannot be immediately supplied during the starting/stopping operations of the reformer 1, when the control tends to be unstable.

A similar problem can also be expected in the case that a water tank and a methanol tank are separately provided.

On the other hand, stopping the operation of the methanol reforming apparatus, the supplies of water, methanol and air are stopped and the catalyst layer is cooled. However, if an excessive amount of air is supplied during the autothermal reaction process, a partial oxidization reaction proceeds, thus giving rise to the possibility of an uncontrolled thermal runaway of the catalyst layer.

Therefore, when stopping the methanol reforming apparatus, it is also important to strictly control the mixing ratio of water, methanol and air so as to avoid the high-rate reaction region. Particularly, since the operation must be stopped while controlling the air supply to a proper level, it takes a long time to stop the operation.

Also, if water and methanol used as the fuel remain in the apparatus when restarting a methanol reforming apparatus that has been stopped, the remaining fuel will deviate the mixing ratio of water, methanol and air when starting the operation, thus giving rise to the possibility of thermal runaway of the catalyst.

Therefore, the operation of stopping the methanol reforming apparatus must be carried out while paying attention to the mixing ratio of water, methanol and air, and the fuel must not be allowed to remain in the apparatus. Thus, the stopping operation takes a long time and requires a complicated control procedure.

BRIEF SUMMARY OF THE INVENTION

The present invention has been made in consideration of the problems described above, and an object thereof is to provide a starting method that allows it to quickly shift to the reforming process after warming up the catalyst.

Another object of the present invention is to provide a fuel supplying apparatus that is capable of maintaining a stable supply of mixed water-methanol solution while preventing water from freezing in a cold climate, and is capable of immediately supplying mixed water-methanol gas that has composition which does not fall in the high-rate reaction region during a starting/stopping operation when the control tends to be unstable.

Still another object of the present invention is to quickly cool down a catalyst layer without causing thermal runaway when stopping a methanol reforming apparatus.

A further object of the present invention is to quickly cool down the catalyst layer while preventing thermal runaway from occurring and removing the remaining fuel when stopping the operation of the methanol reforming apparatus.

(Method of Starting Methanol Reforming Apparatus)

According to the method of starting the methanol reforming apparatus of the present invention, in order to achieve the objects described above, first a catalyst layer (reforming catalyst layer 41 in FIG. 1) is heated to an activation temperature. An external heat source such as an electric heater may be used or a flow of heating gas such as air that has been heated to a predetermined temperature may be used for heating the catalyst layer.

When the catalyst layer (reforming catalyst layer 41) has been heated to the predetermined activation temperature, a mixed water-methanol gas is supplied as the fuel, thereby carrying out the reforming reaction.

The reaction can be started smoothly by controlling the water, methanol and air gas mixture so as to avoid the high-rate reaction region when introducing the fuel.

The present inventors have found, from the three-component mixture phase diagram of water, methanol and air shown in FIG. 2, that the reaction can be started smoothly without allowing the reaction to proceed at a high rate by controlling the amount of mixed gas of water, methanol and air introduced so as to keep the molar ratio of water/methanol (hereinafter referred to as S/C ratio) to 4.6 (=82% by mole/18% by mole) or higher, or to keep the molar ratio of air/methanol (hereinafter referred to as A/C ratio) to 1.5 (=60% by mole/40% by mole) or lower. In this drawing, the hatched portion is the high-rate reaction region.

The present inventors have also found that, once the starting operation has been completed, the reaction does not proceed at a high rate even when the S/C ratio of the mixed water-methanol gas is changed within a range of 1.0–2.0 after the air concentration at the inlet of the catalyst layer (reforming catalyst layer 41) has decreased to 50% by mole or lower.

Based on the facts described above, the present invention makes it possible to control the mixed water-methanol gas so as to avoid the high-rate reaction region when it is introduced into the apparatus when the oxygen concentration is high immediately after starting the operation. It is also possible to quickly shift to the reforming process after the starting operation has been completed.

According to the present invention, two tanks are provided separately: a mixed water-methanol solution tank (27*a*) wherein the mixing ratio of water and methanol is controlled to within a range of S/C ratios (for example, 1.0–2.0) that are used in a normal reforming process, and a mixed water-methanol solution tank (27*b*) wherein mixing ratio of water and methanol is controlled to within a range of S/C ratios (4.6 or higher) used when starting or stopping the reforming process.

The two mixed water-methanol solution tanks (27*a*, 27*b*) are connected with respective liquid transport tubes to an evaporator (22) that is located in a stage prior to the catalyst layer of the reformer (23), while the source for supplying the fuel to the evaporator (22) is switched by means of three way valves (51, 52) or the like.

Since the mixed water-methanol solution used in the normal reforming process is supplied from the mixed water-methanol solution tank (27*a*) where the S/C ratio is controlled to within a range of 1.2–2.0, a mixed water-methanol gas having the ideal molar ratio can be immediately supplied to the reformer (23) when the operation shifts from the start-up to the normal reforming process.

The S/C ratio can be set to any desired value according to the characteristics of the reforming catalyst.

The mixed water-methanol solution used mainly when starting or stopping the reformer (23) is supplied from the other mixed water-methanol solution tank (27*b*) where the S/C ratio is controlled to 4.6 or higher. Thus the composition of the mixed gas of water, methanol and air that is supplied to the reformer (23) does not fall in the high-rate reaction region during the starting/stopping operation when the control tends to be unstable.

This is because, as will be apparent from the three-component phase diagram of FIG. 2, the danger of falling in the high-rate reaction region can be avoided regardless of the mixing conditions as long as the S/C ratio is controlled to 4.6 or higher.

While the composition of the fuel departs more from the high-rate reaction region as the S/C ratio becomes higher, the S/C ratio is preferably set to 4.6 since the mixing ratio should have a value that best facilitates the starting and stoping of the reformer (23).

The method of starting the methanol reforming apparatus according to the present invention has the following effects.

(a) Since the method controls the amount of the mixture of water, methanol and air that is introduced so that the molar ratio of water/methanol becomes 4.6 or higher and/or the molar ratio of air/methanol becomes 1.5 or lower when starting the reformer, the reaction can be started smoothly with a mixing ratio which is clear of the high-rate reaction region even at the start of operation when the oxygen concentration is high.

(b) Since the mixed water-methanol gas is introduced simultaneously with or after the introduction of air, the starting time can be made shorter.

(c) Since the amount of fuel introduced is controlled so that the molar ratio of water/methanol is within a range of 1.0–2.0 once the concentration of air at the inlet of the reforming catalyst has decreased to 50% by mole or lower, changing from the start-up operation to the reforming operation can be carried out quickly without falling in the high-rate reaction region.

(d) A switching means is provided to switch the mixed water-methanol solution tank to be used as the source of fuel supply, between the mixed water-methanol solution tank wherein the molar ratio of water/methanol is controlled to the predetermined concentration used in the reforming process, and the mixed water-methanol solution tank wherein the molar ratio of water/methanol is controlled to 4.6 or higher, in accordance to the operating conditions of the reformer. Thus a stable supply of the mixed water-methanol solution is made possible while preventing the water from freezing in a cold climate.

Also, a mixed water-methanol gas of a composition that is outside of the high-rate reaction region can be immediately supplied during start/stop of the reformer when the control tends to be unstable.

(First Method of Stopping Methanol Reforming Apparatus)

With the first method to stop the methanol reforming apparatus according to the present invention, first the introduction of air is stopped while the introduction of water and methanol to the catalyst layer (reforming catalyst 41 in FIG. 1) is continued, to thereby lower the catalyst layer temperature by making use of the endothermic effect of the methanol steam reforming reaction.

The introduction of air may be stopped either quickly by means of a shut-off valve or gradually by means of a control valve or the like.

On the other hand, the catalyst layer temperature can be lowered quickly by setting the molar ratio of water/methanol, which is to be continually introduced after stopping the supply of air, to a molar ratio higher than that of the normal operation (for example, 1.0–2.0) since this accelerates the methanol steam reforming reaction, which is an endothermic reaction.

When the catalyst layer has been cooled down to a predetermined temperature, the introduction of water and methanol is stopped.

If the molar ratio of water/methanol is set to a value outside of the high-rate reaction region in advance before stopping the introduction of fuel, the operation can be stopped smoothly without causing thermal runaway.

The present inventors have found, from the three-component mixture phase diagram of water, methanol and air shown in FIG. 2, that the reaction can be stopped smoothly without allowing the reaction to proceed at a high rate by controlling the mixing ratio of water, methanol and air so as to keep the molar ratio of water/methanol (hereinafter referred to as S/C ratio) at 4.6 (=82% by mole/18% by mole) or higher. In this drawing, the hatched portion shows the high-rate reaction region.

Therefore, in order to stop the process smoothly, it is preferable to stop the introduction of water and methanol after switching the S/C ratio to 4.5 or higher.

The first method of stopping the methanol reforming apparatus according to the present invention has the following effects.

(a) Operation of the methanol reforming apparatus is stopped by first stopping the introduction of air and then, after changing the molar ratio of water/methanol to a value higher than that of normal operation, the introduction of water and methanol is stopped. As a result, it is made possible to cause the steam reforming reaction which is an endothermic reaction to proceed while suppressing the partial oxidization reaction which is an exothermic reaction, by first stopping the introduction of air and, moreover, the endothermic reaction can be further accelerated by the change of the molar ratio of water/methanol that is subsequently made.

As a result, the catalyst temperature can be lowered quickly and the time required to stop the operation can be reduced.

(b) Since the introduction of water and methanol is stopped after switching the value of the molar ratio of water/methanol to 4.6 or higher, clear of the high-rate reaction region, when stopping the methanol reforming apparatus, the process can be stopped smoothly without causing thermal runaway.

(Second Method of Stopping Methanol Reforming Apparatus)

With the second method to stop the operation of the methanol reforming apparatus according to the present invention, first the introduction of air is stopped while the introduction of water and methanol to the catalyst layer (reforming catalyst 41 in FIG. 1) is continued, to thereby lower the catalyst layer temperature by making use of the endothermic effect of the methanol steam reforming reaction.

The introduction of air may be stopped either quickly by means of a shut-off valve or gradually by means of a control valve or the like.

When the catalyst layer has been cooled down to a predetermined temperature, the introduction of water and methanol is stopped.

Provided that the operation described above is carried out while the catalyst layer temperature is 100° C. or higher, the methanol steam reforming reaction can be effectively continued by using the residual heat of the catalyst layer.

Consequently, the cooling of the catalyst layer is accelerated and the methanol concentration in the mixed gas can be lowered quickly to 18% by mole or less, which is outside of the high-rate reaction region.

The present inventors found, from the three-component mixture phase diagram of water, methanol and air shown in FIG. 2, that the reaction does not proceed at a high rate when the methanol concentration in the mixed gas is 18% by mole or less. In this drawing, the hatched portion shows the high-rate reaction region.

Therefore, the water and methanol that remain in the apparatus (hereinafter sometimes referred to as "residual fuel") can be evaporated and removed by reintroducing air into the catalyst layer to oxidize the catalyst and utilizing the oxidization heat generated thereby, after the methanol concentration in the mixed gas has decreased to 18% by mole or less.

Once the residual fuel has been removed by the operation described above, the catalyst temperature can be lowered quickly without causing dew condensation even when cool air at a temperature lower than 100° C. is introduced into the catalyst.

Also because the residual fuel gas, too, is purged from the apparatus by the cool air, the possibility of the amount of the mixture of water, methanol and air introduced deviating from the set value when restarting the operation can be effectively avoided.

The second method of stopping the operation of the methanol reforming apparatus according to the present invention has the following effects.

(a) The introduction of water and methanol is stopped while the catalyst layer temperature is 100° C. or higher after the introduction of air has been stopped and the catalyst temperature has decreased due to the steam reforming reaction when stopping the operation of the methanol reforming apparatus. Thus the methanol steam reforming reaction can be effectively continued by using the residual heat of the catalyst layer.

Consequently, the cooling down of the catalyst layer is accelerated and the methanol concentration in mixed gas can be lowered quickly to 18% by mole or less, which is outside of the high-rate reaction region.

(b) If air is reintroduced after lowering the methanol concentration to 18% by mole or less and water and methanol that remain in the apparatus are evaporated and removed by utilizing the oxidization heat generated as the catalyst is oxidized, the possibility of altering the mixing ratio of water, methanol and air during start-up can be effectively avoided.

(c) If air at a temperature of 100° C. or lower is introduced after removing water and methanol by evaporation, the catalyst temperature can be lowered quickly without causing dew condensation.

Also because the introduction of air purges the residual fuel from the apparatus, the possibility of altering the mixing ratio can be effectively avoided.

DETAILED DESCRPTION OF THE INVENTION

Preferred embodiments of the present invention will now be described below with reference to the accompanying drawings.

FIRST EMBODIMENT

Figure 1:
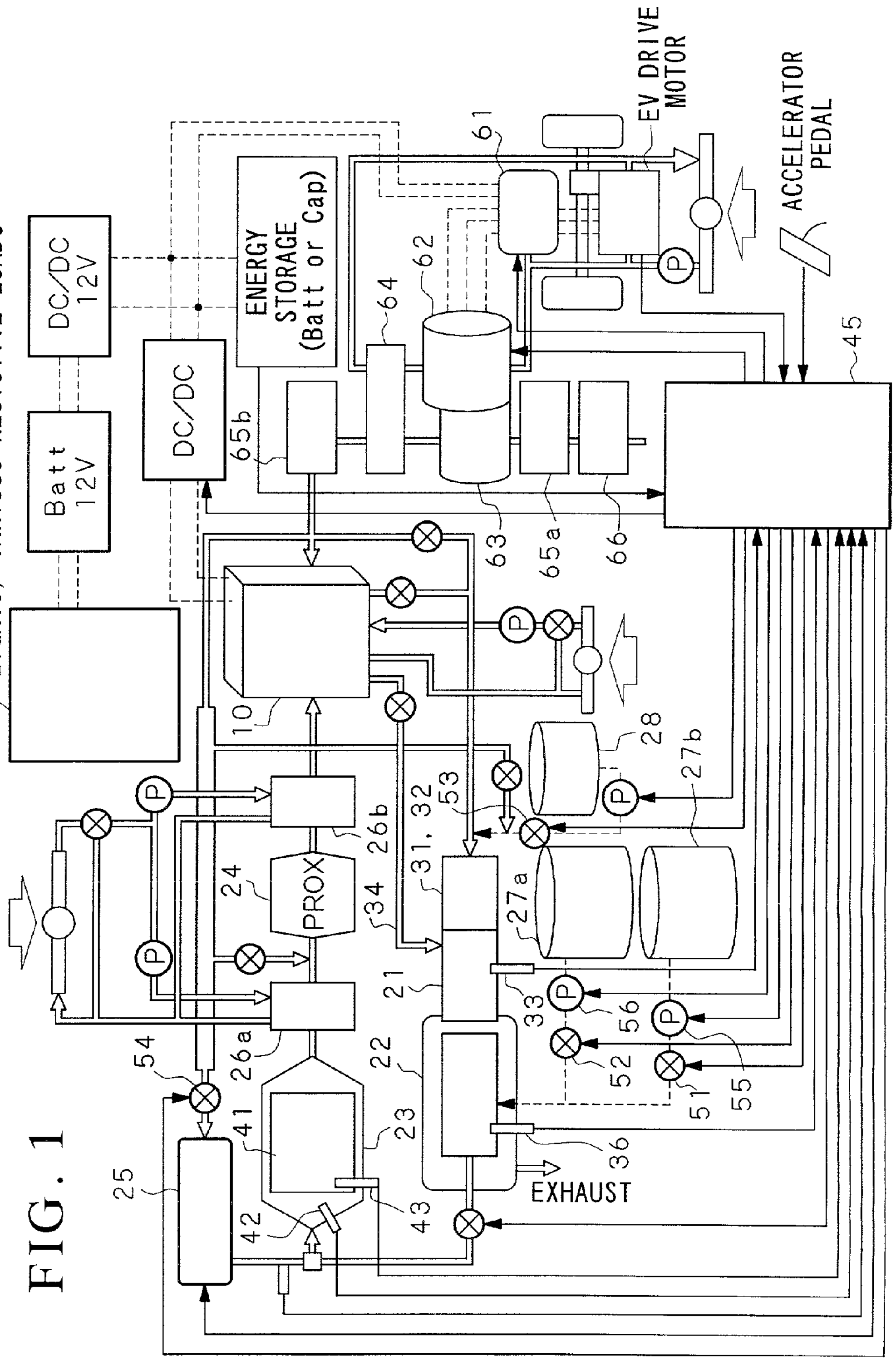
FIG. 1 shows a system for supplying fuel to a fuel cell in an electric vehicle according to the present invention.

FIG. 1 shows a system for supplying fuel to a fuel cell in an electric vehicle, where the reference numeral 10 denotes a fuel cell.

The fuel cell 10 generates electricity by using hydrogen and oxygen that is taken from air as the fuel.

A hydrogen supply system and an air supply system for the fuel cell 10 will be described below.

[Hydrogen Supply System]

The hydrogen supply system comprises a combustion device 21, an evaporator 22, a reformer (methanol reforming apparatus) 23, a CO eliminator 24, a starting heater 25, heat exchangers 26*a*, 26*b*, mixed water-methanol solution tanks 27*a*, 27*b* and a methanol tank 28 as major components.

The combustion device 21 has an electric heater 31 serving as an ignition device, a combustion catalyst 32 that maintains the state of combustion and a temperature sensor 33 that monitors the temperature inside of the apparatus, wherein methanol supplied from the methanol tank 28 is burned with the air supplied from the air supply system, thereby generating a combustion gas used to warm up the evaporator 22 which evaporates the mixed water-methanol solution that is supplied to the evaporator 22.

Connected to the combustion device 21 is an off gas tube 34 provided for the purpose of reusing the off gas that includes hydrogen-rich gas, which is generated in the reformer 23 in the period from the startup to the normal operation, and unreacted hydrogen, which is discharged from the fuel cell 10 during stationary operation, as the fuel for combustion.

In the evaporator 22, the mixed water-methanol solution that has been supplied from the mixed water-methanol solution tank 27*a* where the S/C ratio is controlled to 1.5 or from the mixed water-methanol solution tank 27*b* where the S/C ratio is controlled to 4.6 is sprayed from a nozzle and evaporated by the combustion gas supplied from the combustion device 21, thereby generating the mixed water-methanol gas.

The evaporator 22 is provided with a temperature sensor 36 for monitoring the temperature inside of the device.

Installed in the reformer 23 is a reforming catalyst 41 comprising a honeycomb structure of which surface is coated with a catalyst such as Ni, Ru, Rh, Cu—Zn or the like, so that the mixed water-methanol gas supplied from the evaporator 22 is brought onto the reforming catalyst layer 41 to generate hydrogen-rich gas.

The reforming catalyst layer 41 has an $O_2$ sensor 42 installed at the inlet thereof, and a temperature sensor 43 installed inside of the reforming catalyst layer 41.

In the reformer 23, the autothermal reforming reaction takes place as follows.

$$CH_3OH+H_2O \rightarrow 3H_2+CO_2 \quad (1)$$

$$CH_3OH+2O_2 \rightarrow 2H_2O+CO_2 \quad (2)$$

The reaction scheme (1) represents the steam reforming reaction by methanol and water that produces the target product of hydrogen.

The reaction scheme (1) represents the reaction of partial oxidization of methanol that produces heat by oxidization reaction which provides for the heat needed in the endothermic reaction represented by reaction scheme (1).

In the reformer 23, in addition to the reactions represented by the reaction schemes (1) and (2), a trace amount of carbon monoxide is generated in an inevitable reaction of methanol decomposition represented as follows.

$$CH_3OH \rightarrow 2H_2+CO \quad (3)$$

The carbon monoxide deteriorates Pt catalyst provided in the fuel cell 10 and leads to lower efficiency of power generation and shortens the service life of the cell, and is therefore removed by the CO eliminator 24 installed in a latter stage.

The CO eliminator 24 has a selective oxidization catalyst layer made by coating the surface of a honeycomb structure with a catalyst such as Pt or Ru. When hydrogen-rich gas generated by the reformer 23 is supplied, the carbon monoxide is removed from the hydrogen-rich gas in the following reaction of selective oxidization of Co.

$$2CO+O_2 \rightarrow 2CO_2 \quad (4)$$

Installed between the reformer 23 and the CO eliminator 24 is the heat exchanger 26*a* provided for the purpose of cooling down the hydrogen-rich gas generated by the reformer 23 thereby protecting the selective oxidization catalyst in the CO eliminator 24 from thermal damage. Similarly installed between the CO eliminator 24 and he fuel cell 10 is the heat exchanger 26*b* provided for the purpose of cooling down the hydrogen-rich gas supplied from the CO eliminator 24 thereby protecting the Pt catalyst in the fuel cell 10 from thermal damage.

Valves 51, . . . , pumps 55, . . . installed in the hydrogen supply system are controlled by an ECU (Electronic Control Unit) 45.

The ECU 45 sends command signals to the valves 51, . . . , the pumps 55, . . . in accordance to the output signals from the $O_2$ sensor 42 and the temperature sensor 43 and a stop command, thereby causing these devices to function.

The ECU 45 functions also as means for switching the mixed water-methanol solution tanks 27*a*, 27*b* that are used as fuel supply sources.

[Air Supply System]

The air supply system comprises a PCU (power control unit) 61, a drive motor 62, a super charger 63, an inter cooler 64 and filters 65*a*, 65*b* as major components, and supplies air, that is introduced from the outside, to the fuel cell 10, the combustion device 21 and the starting heater 25.

Main function of the PCU 61 is to adjust the output of the drive motor 62, by regulating the electric power supplied from the fuel cell 10 and supplies the regulated power to the drive motor 62.

The super charger 63 compresses the air taken from the outside through the filter 65*a*, via a resonator 66.

The inter cooler 64 is provided for cooling down the air that has been heated through compression by the super charger 63. The cooled air passes through the filter 65*b*, which is installed in the latter stage of the inter cooler 64, and is supplied to the fuel cell 10, the combustion device 21 and the starting heater 25.

Now the method of starting the reformer 23 according to this embodiment will be described below.

To start the apparatus in cold state, it is necessary to warm up the evaporator 22, the reformer 23 and the CO eliminator 24 of the hydrogen supply system. For this reason, the valve 53 is opened to spray methanol into the combustion device 21 and air that includes oxygen is supplied from the air supply system to burn the methanol, while the combustion gas generated thereby is supplied to evaporator 22 for the warming up thereof.

Air is supplied also to the starting heater 25, while the air heated therein is sent to the reformer 23 thereby warming up the reformer 23 and the CO eliminator 24 installed downstream thereof.

When the evaporator 22 has been heated to a temperature high enough to evaporate the mixed water-methanol solution and the reformer 23, the reforming catalyst 41 in the CO eliminator 24 and the selective oxidization catalyst layer have reached the activation temperature, the valves 53, 54 are closed, while spraying of methanol into the combustion device 21 and the supply of air to the starting heater 25 are stopped.

At this time, the reformer 23 is supplied only with air from the air supply system.

The combustion device 21 is also supplied only with air from the air supply system, while the state of combustion by the combustion catalyst 32 is maintained.

Then the valve 51 is opened with the valve 52 is left closed, while the pump 55 supplies the mixed water-methanol solution, with the S/C ratio therein being controlled to 4.6, from the mixed water-methanol solution tank 27*b* to the evaporator 22, so that the mixed water-methanol solution is sprayed from the nozzle into the evaporator 22.

In the evaporator 22, the mixed water-methanol solution is evaporated by the combustion gas supplied from the combustion device 21, thereby generating the mixed water-methanol gas which is supplied to the reformer 23.

In the reformer 23, the mixed water-methanol gas is passed through the reforming catalyst 41 to produce hydrogen-rich gas through the reactions of the reaction schemes (1) and (2).

Figure 2:
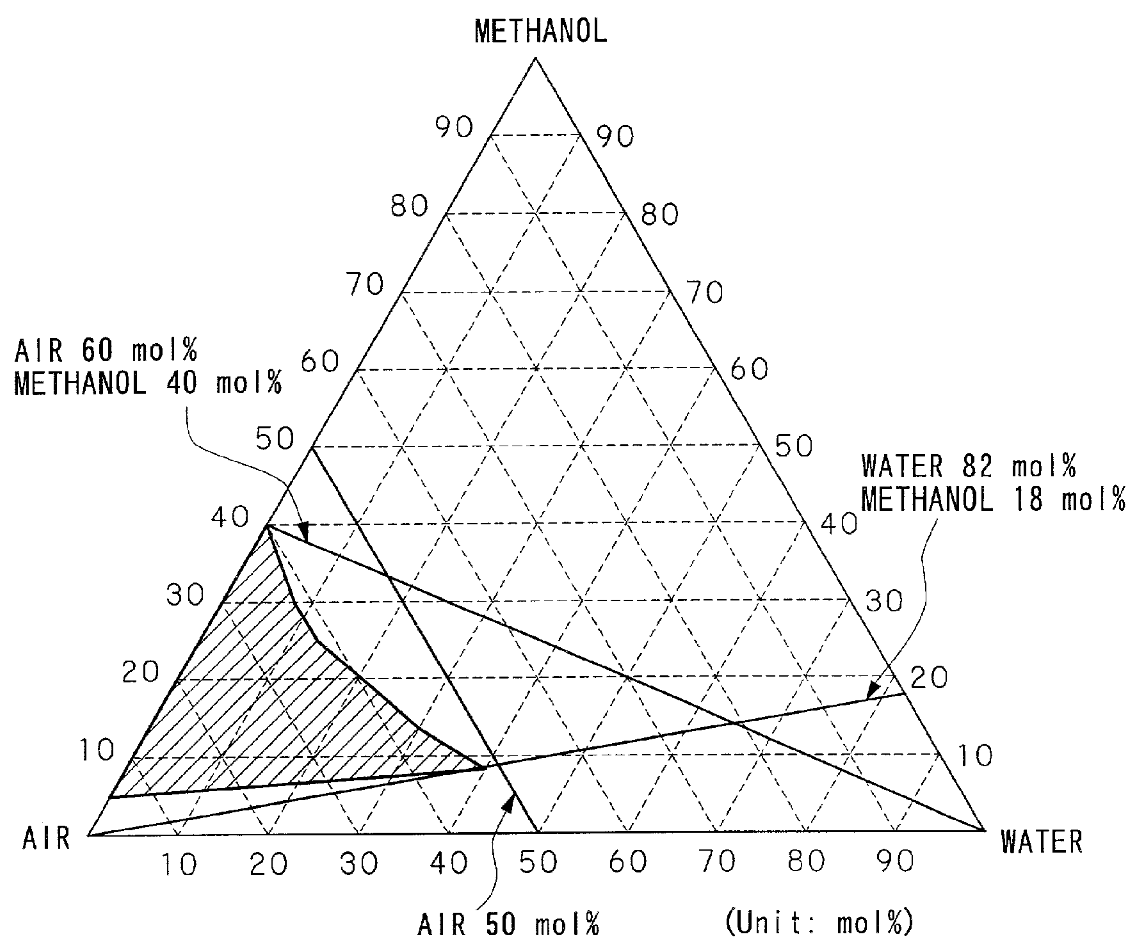
FIG. 2 is a three-component mixture phase diagram of water, methanol and air.

At this time, according to the three-component mixture phase diagram of water, methanol and air of FIG. 2, smooth startup is achieved provided that the S/C ratio of the mixed water-methanol gas is 4.6 which means the mixing ratio is outside of the high-rate reaction region.

The reforming process enters the steady state upon lapse of some time after starting the reformer 23.

During this transition of the state of operation, it is necessary to change the S/C ratio from 4.6, which is the value for starting the operation, to 1.0 to 2.0 which is a range of values for normal reforming operation.

Accordingly, the valve 51 is closed and the valve 52 is opened when the air concentration measured by the $O_2$ sensor 42 installed at the inlet of the reforming catalyst layer 41 has decreased to 50% by mole or less.

Then the pump 56 supplies the mixed water-methanol solution with the S/C ratio controlled to 1.5 from the mixed water-methanol solution tank 27*a* to the evaporator 22, so that the mixed water-methanol solution is sprayed from the nozzle into the evaporator 22.

In the evaporator 22, the mixed water-methanol solution is evaporated by the combustion gas supplied from the combustion device 21 to generate the mixed water-methanol gas which is supplied to the reformer 23.

The hydrogen-rich gas produced in the reformer 23 is cooled down from about 300° C. to about 100° C. while passing through the heat exchanger 26*a*, to be supplied to the CO eliminator 24.

In the CO eliminator 24, carbon monoxide is removed in the reaction of the reaction scheme (4) by passing the hydrogen-rich gas through the selective oxidization catalyst layer.

The hydrogen-rich gas with CO removed therefrom is cooled down from about 180° C. to about 80° C. while passing through the heat exchanger 26*b*, and then supplied to the fuel cell 10 to be used in power generation.

On the other hand, the air that has been introduced through the resonator 66 and the filter 65*a* into the air supply system is compressed in the super charger 63 and is then cooled down in the inter cooler 64, before passing through the filter 65*b* and supplied to the fuel cell 10 and the combustion device 21.

Oxygen included in the air that is supplied to the fuel cell 10 is used, together with hydrogen supplied from the hydrogen supply system, for power generation.

The air supplied to the combustion device 21 is used for generating the combustion gas.

The off gas that includes the unreacted hydrogen discharged from the fuel cell 10 is returned to the combustion device 21 through the off gas tube 34, and is reused as the fuel for combustion.

SECOND EMBODIMENT

Figure 3:
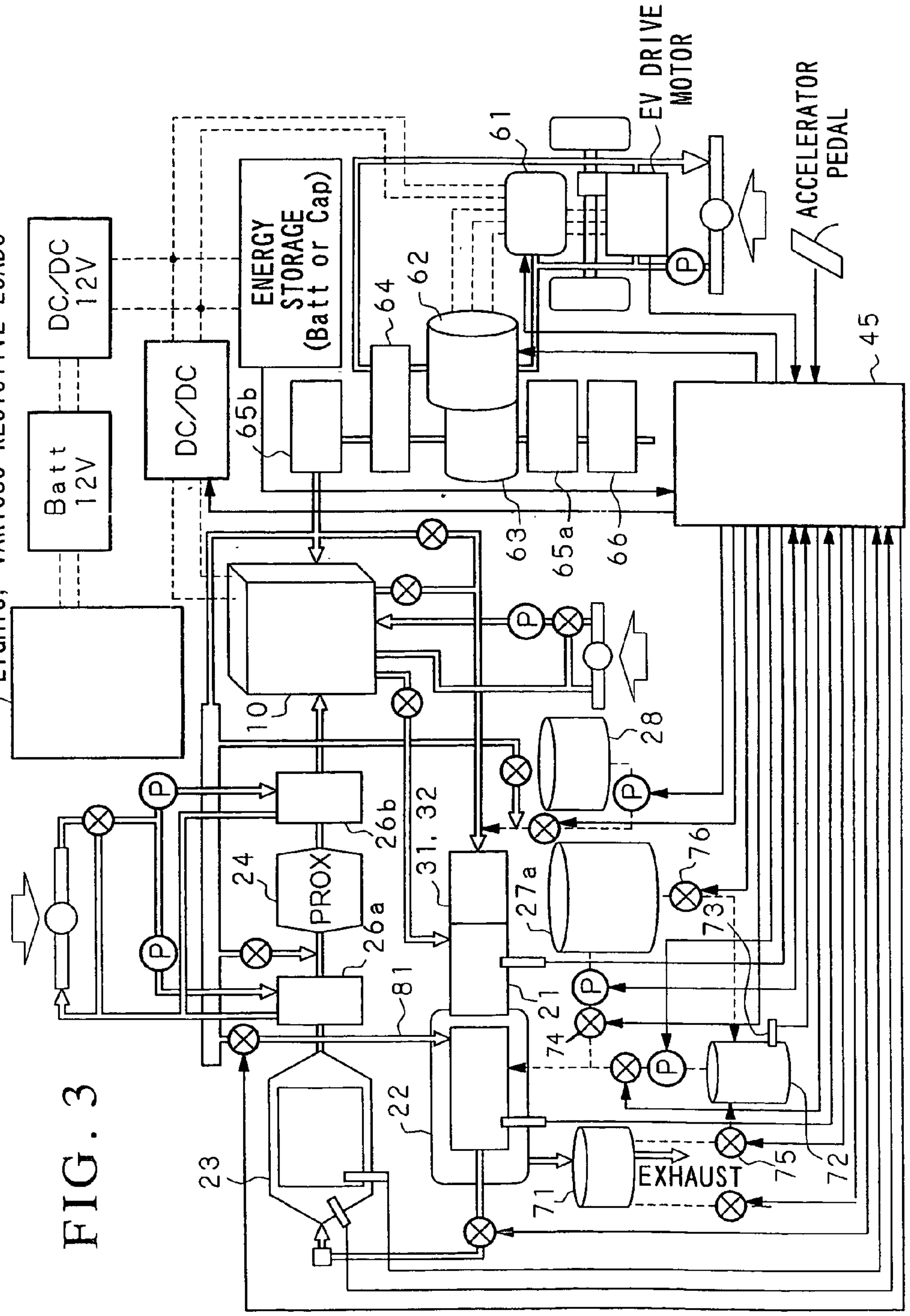
FIG. 3 shows a system for supplying fuel to a fuel cell in an electric vehicle according to Second Embodiment and Fourth Embodiment of the present invention.

Method of starting the reformer 23 according to the second embodiment of the present invention will be described below with reference to FIG. 3. Identical components to those shown in FIG. 1 will be assigned with the same reference numerals and description thereof will be omitted.

This embodiment is similar to First Embodiment, except for a part of the hydrogen supply system and a part of the air supply system which are different from those of First Embodiment.

The hydrogen supply system has a condenser 71 and an S/C control tank 72 instead of the mixed water-methanol solution tank 27*b* where the S/C ratio is controlled to 4.6 shown in FIG. 1.

The condenser 71 recovers water from the evaporator, that is generated in the reaction and combustion in the fuel cell 10, from the evaporator 22. As shown in the FIG. 3, a first line (via valve 76) that supplies the mixed water-methanol solution from the first mixed water-methanol solution tank to the second mixed water-methanol solution tank; a second line (via valve 75) that supplies the water from the condenser to the second mixed water-methanol solution tank; a third line (valve 74) that supplies the mixed water-methanol solution from the second mixed water-methanol solution tank to the evaporator.

In the S/C control tank 72, mixed water-methanol solution (S/C ratio 4.6 or higher) used in start/stop operation is prepared from the mixed water-methanol solution (S/C ratio 1.5) supplied from the mixed water-methanol solution tank 27*a* and the recovered water supplied from the condenser 71.

S/C ratio of the liquid in the S/C control tank 72 is constantly monitored by a methanol sensor 73 of which signal is sent to the ECU 45.

The ECU 45 controls the extents of opening of valves 75, 76 according to the signal.

After the preparation of the mixed water-methanol solution by the S/C control tank 72 and when the operation is stopped, excessive recovered water in the condenser 71 is discarded.

The air supply system has an air supply line 81 connected to the evaporator 22.

Accordingly, the evaporator 22 also serves as a heater that heats the air supplied via the air supply line 81.

Consequently, in this embodiment, the starting heater 25 shown in FIG. 1 is not necessary since the reformer 23 can be warmed up by the heated air.

With the constitution described above, too, the mixed water-methanol solution tank 27*a* for the normal reforming process and the S/C control tank 72 for the start/stop operation can be switched according to the state of operation of the reformer 23, and therefore it is made possible to maintain stable supply of mixed water-methanol solution while preventing water from freezing in a cold climate, and is capable of immediately supplying mixed water-methanol gas that has composition outside of the high-rate reaction region during starting/stopping operation of the reformer 23 when the control tends to be unstable.

THIRD EMBODIMENT

A method of stopping the reformer 23 according to the third embodiment of the present invention will now be described below with reference to the system diagram of fuel supply to the fuel cell of the electric vehicle shown in FIG. 1. Before the description, an example of steady operation (normal reforming operation) will be outlined.

During steady operation, the valve 50 is open so that air from the air supply system, namely the air that has been introduced through the resonator 66 and the filter 65*a,* cooled by the inter cooler 64 and has passed through the filter 65*b,* is supplied to the combustion device 21 and the evaporator 22, the reformer 23, . . . , that are installed in the latter stage thereof.

With the valve 51 being closed and the valve 52 open, the pump 56 supplies the mixed water-methanol solution with the S/C ratio controlled to 1.5 from the mixed water-methanol solution tank 27*a* to the evaporator 22, so that the mixed water-methanol solution is sprayed from the nozzle into the evaporator 22.

In the evaporator 22, the mixed water-methanol solution is evaporated by the combustion gas supplied from the combustion device 21, thereby generating the mixed water-methanol gas which is supplied to the reformer 23.

In the reformer 23, the mixed water-methanol gas is passed through the reforming catalyst 41 to produce hydrogen-rich gas through the reactions of the reaction schemes (1) and (2).

The hydrogen-rich gas produced in the reformer 23 is cooled down from about 300° C. to about 100° C. while passing through the heat exchanger 26*a,* to be supplied to the CO eliminator 24.

In the CO eliminator 24, carbon monoxide is removed in the reaction of the reaction scheme (4) by passing the hydrogen-rich gas through the selective oxidization catalyst layer.

The hydrogen-rich gas with CO removed therefrom is cooled down from about 180° C. to about 80° C. while passing through the heat exchanger 26*b,* and is then supplied to the fuel cell 10.

In the fuel cell 10, the hydrogen-rich gas supplied from the hydrogen supply system and air supplied from the air supply system are used to generate electricity.

While the fuel cell 10 discharges the off gas that includes unreacted hydrogen, the off gas is returned through an off gas tube to the combustion device 21 and is reused as the fuel of combustion.

Now the method to stop the steady operation of the reformer 23 will be described below.

This reformer stopping method comprises a first step in which the introduction of air to the reformer 23 is stopped, a second step in which the S/C ratio of mixed water-methanol gas supplied to the reformer 23 is changed to a value higher than that of the steady operation, and a third step in which the introduction of the mixed water-methanol gas to the reformer 23 is stopped.

In the first step, the valve 50 that has been open during the steady operation is closed.

This shuts off the introduction of air from the air supply system to the hydrogen supply system, namely to the combustion device 21 and the evaporator 22, the reformer 23, . . . , that are installed in the latter stage thereof.

At this time, since the ratio of air in the mixture decreases in comparison to water and methanol in the reformer 23, the endothermic reaction of the reaction scheme (1) proceeds while the exothermic reaction of the reaction scheme (2) is suppressed. As a result, the reforming catalyst layer 41 is effectively cooled.

In the second step, the valve 52 that has been open during the steady operation is closed and the valve 51 that has been closed is opened.

This causes the pump 55 to supply the mixed water-methanol solution with the S/C ratio controlled to 4.6 from the mixed water-methanol solution tank 27*b* to the evaporator 22, so that the mixed water-methanol gas generated through evaporation in the evaporator 22 is supplied to the reformer 23.

At this time, since the S/C ratio of the mixed water-methanol gas is set higher than that of the steady operation (for example, S/C=1.0–2.0), the endothermic reaction of the reaction scheme (1) is accelerated so that the reforming catalyst layer 41 is cooled down quickly.

Last, in the third step, when the reforming catalyst layer 41 is cooled down to a predetermined temperature, the valve 51 that was opened in the second step is closed.

This shuts off the supply of the mixed water-methanol solution from the mixed water-methanol solution tank 27*b* to the evaporator 22 and stops the introduction of the mixed water-methanol gas to the reformer 23.

At this time, since the S/C ratio is set to a value outside of the high-rate reaction region (refer to FIG. 2), the process can be stopped smoothly without causing thermal runaway.

FOURTH EMBODIMENT

A method of stopping the reformer 23 according to the fourth embodiment of the present invention will be described below with reference to FIG. 3, which is also referred to in the second embodiment.

The constitution of this embodiment is the seme as that of the second embodiment.

With this constitution, the S/C ratio can be changed in the second step by switching the mixed water-methanol solution tank 27*a* for the normal reforming process and the S/C control tank 72 for the start/stop operation when stopping the operation of the reformer 23, and therefore it is made possible to immediately supply the mixed water-methanol gas that has a composition which does not fall in the high-rate reaction region even when stopping the operation of the reformer 23 when the control tends to be unstable. Thus the reforming catalyst layer 41 can be cooled down smoothly and quickly, without causing thermal runaway of the reforming catalyst layer 41.

FIFTH EMBODIMENT

A method of stopping the reformer according to the fifth embodiment of the present invention will now be described below, with regard to the reformer 23 in steady reforming operation, with reference to the system diagram of fuel supply to the fuel cell of the electric vehicle shown in FIG. 1. In this embodiment, a methanol sensor not shown in the drawing is provided inside of the reforming catalyst layer 41 in addition to the temperature sensor 43.

This reformer stopping method comprises a first step in which the introduction of air to the reformer 23 is stopped, a second step in which the introduction of mixed water-methanol gas to the reformer 23 is stopped, a third step in which air is introduced again, and a fourth step in which air of a temperature of 100° C. or lower is introduced.

In the first step, the valve 50 that has been open during the steady operation is closed.

This shuts off the introduction of air from the air supply system to the hydrogen supply system, namely to the combustion device 21 and the evaporator 22, the reformer 23, . . . , that are installed in the latter stage thereof.

At this time, since the ratio of air in the mixture decreases in comparison to water and methanol in the reformer 23, the endothermic reaction of the reaction scheme (1) proceeds while the exothermic reaction of the reaction scheme (2) is suppressed. As a result, the reforming catalyst layer 41 is effectively cooled.

In the second step, the valve 52 that has been open during the steady operation is closed while the reforming catalyst layer 41 which is being cooled is still hotter than 100° C.

Temperature of the reforming catalyst layer 41 is constantly monitored by a temperature sensor 43 installed therein, and the ECU 45 controls the valve 52 to close according to the signal from the temperature sensor 43.

This shuts off the supply of the mixed water-methanol solution from the mixed water-methanol solution tank 27*a* to the evaporator 22 and stops the introduction of the mixed water-methanol gas to the reformer 23.

Even after the introduction has been stopped, the steam reforming reaction is effectively continued by making use of the residual heat of the reforming catalyst layer 41, thereby accelerating the cooling of the reforming catalyst layer 41. At the same time, methanol concentration in the mixed gas quickly decreases to 18% by mole or lower, clear of the high-rate reaction region.

Next in the third step, when methanol concentration has decreased to 18% by mole or lower, the valve 50 that was closed in the first step is opened.

The methanol concentration is monitored by the methanol sensor installed in the reforming catalyst layer 41, and the ECU 45 controls the valve 50 to open according to the signal from the methanol sensor.

This causes air from the air supply system to be introduced again into the reforming catalyst 41, so that the catalyst is oxidized and refreshed.

Water and methanol that remain in the reformer 23, namely the residual fuel, are evaporated and removed by the oxidization heat generated when the catalyst is oxidized.

It is made possible to introduce the air again in the third step because the methanol concentration is 18% by mole or lower, clear of the high-rate reaction region.

Last, in the fourth step, air that has been cooled down to 100° C. or lower while passing through the inter cooler 64 in the air supply system is introduced into the reforming catalyst layer 41.

At this time, since the residual fuel has been effectively removed in the third step, the catalyst can be cooled down quickly by the cold air without causing dew condensation. Moreover, since the residual fuel gas is purged at the same time, a trouble such as alteration in the mixing ratio of water, methanol and air when restarting the operation can be effectively avoided.

EXAMPLE 1

Using a test apparatus equipped with a reactor tube made of quartz having inner diameter of 20 mm that was filled with 9.2 g of methanol reforming catalyst pellets including Cu, Zn and Al in the ratio of 1.3:1:0.05, heated air was introduced to the catalyst at a flow rate of 40 ml/min thereby heating the catalyst to 230° C.

Figure 4:
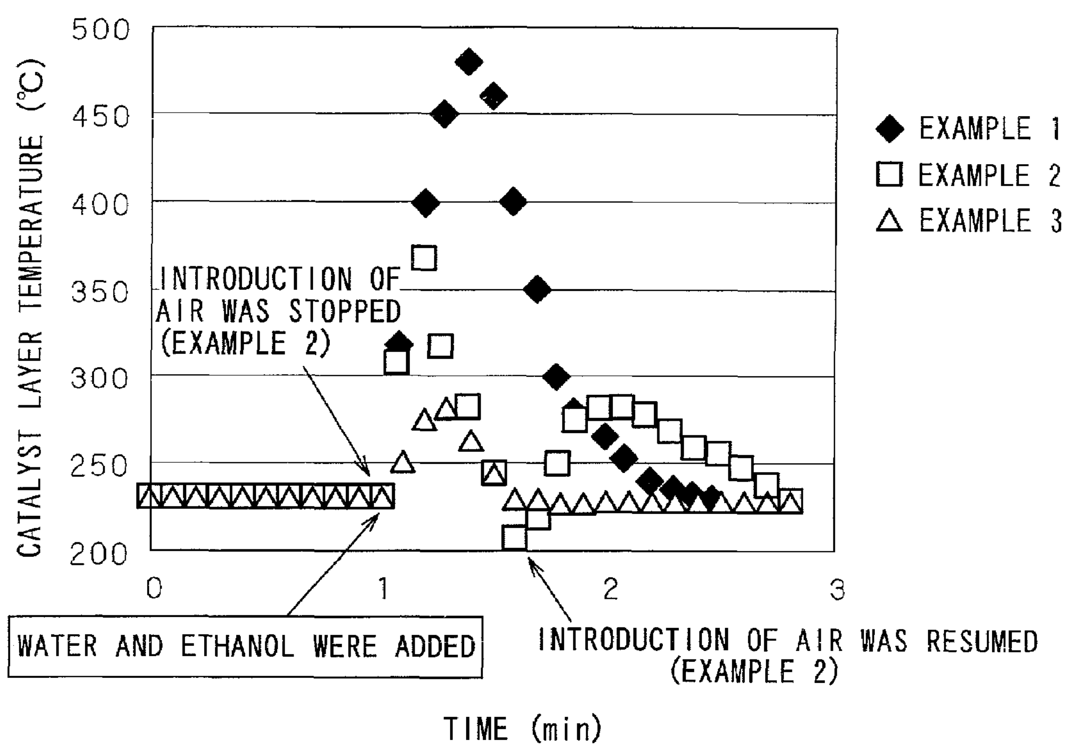
FIG. 4 shows a change in the temperature of a catalyst measured using a test apparatus according to Examples 1 to 3.

After making sure that the catalyst has been heated to 230° C., the mixed water-methanol solution of which S/C ratio was regulated to 1.5 was supplied to the evaporator, and the mixed water-methanol gas generated therein was supplied to the catalyst at a flow rate of 1.8 ml/min, while recording the changes in the catalyst temperature immediately after supplying the gas (plots ♦ in FIG. 4).

EXAMPLE 2

Using the same test apparatus as in Example 1, heated air was introduced to the catalyst at a flow rate of 40 ml/min to heat the catalyst to 230° C.

After stopping the introduction of air and making sure that the catalyst was heated to 230° C., the mixed water-methanol solution similar to that of Example 1 was supplied to the evaporator, and the mixed water-methanol gas generated therein was supplied to the catalyst at a flow rate of 1.8 ml/min, while recording the changes in the catalyst temperature immediately after supplying the gas. Then the introduction of air was resumed at a flow rate of 40 ml/min while recording the changes in the catalyst temperature immediately after the introduction (plots □ in FIG. 4).

EXAMPLE 3

Present Invention

Using the same test apparatus as in Example 1, heated air was introduced to the catalyst at a flow rate of 40 ml/min to heat the catalyst to 230° C.

After making sure that the catalyst was heated to 230° C., the mixed water-methanol solution of which S/C ratio was regulated to 4.6 was supplied to the evaporator, and the mixed water-methanol gas generated therein was supplied to the catalyst at a flow rate of 1.8 ml/min, while recording the changes in the catalyst temperature immediately after supplying the gas (plots Δ in FIG. 4).

When the mixed water-methanol gas having a low value of S/C ratio was supplied to the heated catalyst under the condition of introducing air as in Example 1, it was confirmed that the catalyst temperature rose rapidly and it took a long time to stabilize the reaction, while the danger of thermal runaway increased.

This is because the exothermic reaction of the reaction scheme (2) proceeds at a higher rate than the endothermic reaction of the reaction scheme (1).

Similarly, when the mixed water-methanol gas having a low value of S/C ratio was supplied while stopping the introduction of air as in Example 2, it was confirmed that the catalyst temperature rose rapidly, although the peak temperature as high as in Example 1 was not reached.

This is because the exothermic reaction of the reaction scheme (2) proceeds rapidly as the system already includes air even when the air is not flowing.

However, only the endothermic reaction of the reaction scheme (1) proceeds thereafter because of the lack of air, resulting in a problem that the catalyst temperature drops quickly.

Even when the introduction of air is resumed, the catalyst temperature rises rapidly, although the peak temperature as high as in the case of supplying the mixed water-methanol gas is not reached.

As described above, unstable condition wherein the temperature repeatedly fluctuates continues for several minutes in Example 2.

In contrast to Examples 1 and 2, when the S/C ratio was set to a value outside of the high-rate reaction region in the early stage of introducing the mixed water-methanol gas as in Example 3, excessive increase in the catalyst temperature and fluctuation of the temperature could be suppressed and the danger of thermal runaway could be avoided. Consequently, switching to the mixed water-methanol solution of the desired value of S/C ratio could be quickly provided for.

This is because the endothermic reaction of the reaction scheme (1) proceeds predominantly over the exothermic reaction of the reaction scheme (2) due to the supply of water-rich fuel, thus maintaining the thermal balance.

The present invention is not limited to the embodiments described above, and the reforming catalyst 41 may be warmed up by electric heating instead of air heating.

As will be apparent from FIG. 2, the process can be started smoothly outside of the high-rate reaction region similarly to the above also by controlling the mixing ratio of water, methanol and air so that the A/C ratio becomes 1.5 or lower.

This is because lower ratio of oxygen is introduced compared to methanol, resulting in less amount of heat generated in the reaction of the reaction scheme (2).

The S/C ratio may also be controlled to be 4.6 or higher while the A/C ratio is set to 1.5 or lower, as a matter of course.

EXAMPLE 4

Using the same test apparatus as in Example 1, heated air was introduced to the catalyst at a flow rate of 40 ml/min to heat the catalyst to 230° C.

Meanwhile, the mixed water-methanol solution of which S/C ratio was regulated to 1.5 was supplied to the evaporator.

The mixed water-methanol gas generated in the evaporator was supplied to the catalyst at a flow rate of 1.8 ml/min thereby starting the reforming reaction by the autothermal reaction method.

Amount of the air introduced was controlled to keep the catalyst layer at 230° C. and the reforming reaction was stabilized.

Figure 5:
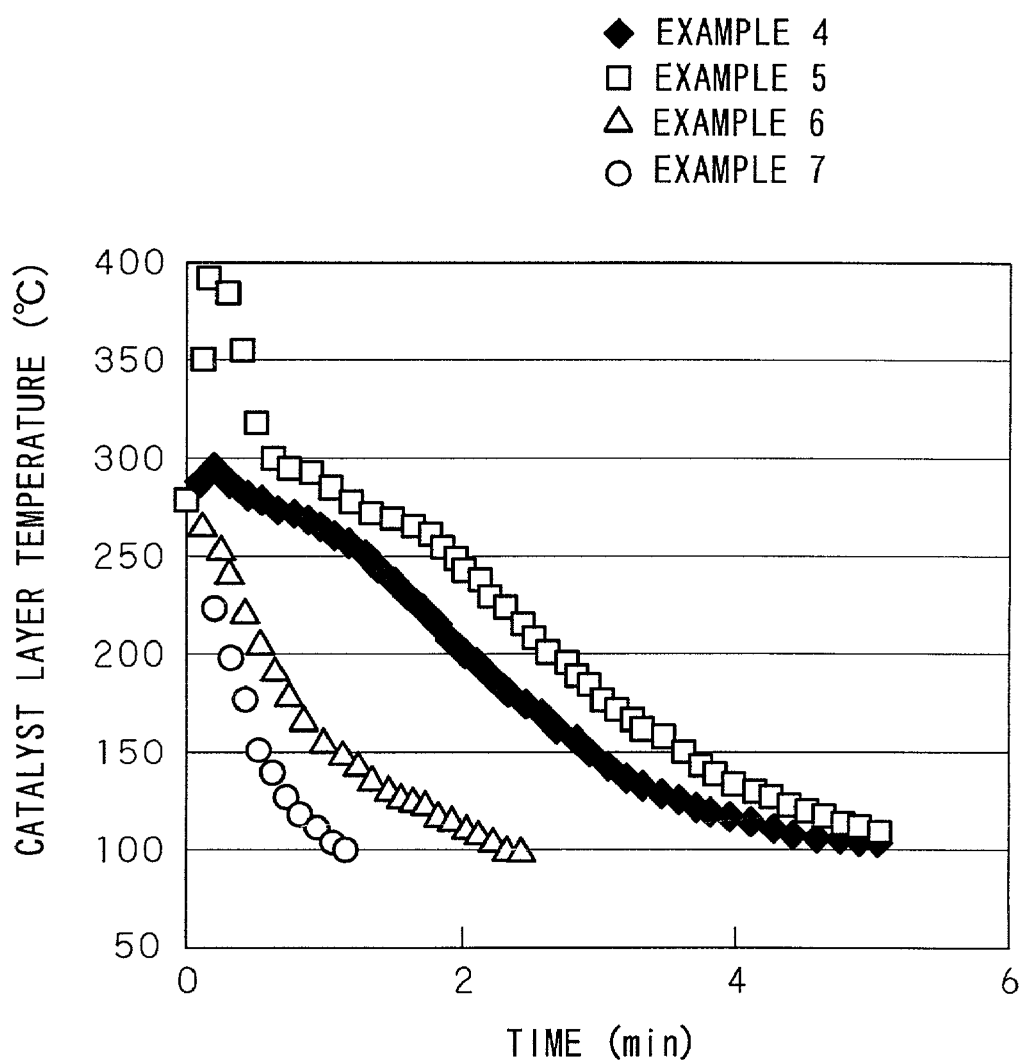
FIG. 5 shows a change in the temperature of a catalyst measured using a test apparatus according to Examples 4 to 7.
Figure 6:
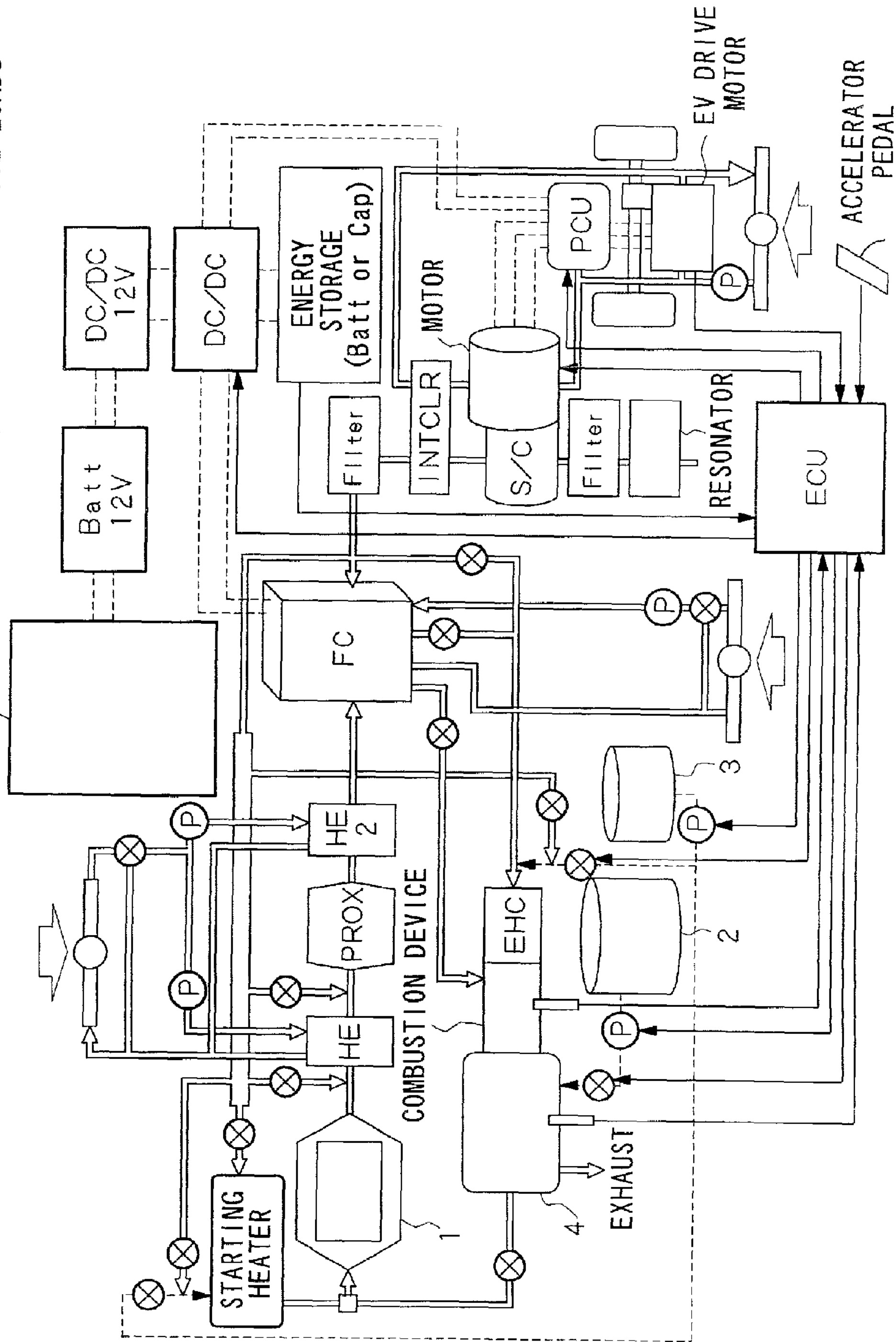
FIG. 6 shows a system for supplying fuel to a fuel cell in an electric vehicle according to a conventional example.

Then to stop the process, the supplies of water, methanol and air were stopped simultaneously while recording the changes in the catalyst temperature (plots ♦ in FIG. 5).

EXAMPLE 5

Using the same test apparatus as in Example 1, the reforming reaction was started and stabilized in the same procedure as in Example 4.

Then to stop the process, first the supplies of water and methanol were stopped and then the supply of air was stopped, while recording the changes in the catalyst temperature (plots □ in FIG. 5).

EXAMPLE 6

Using the same test apparatus as in Example 1, the reforming reaction was started and stabilized in the same procedure as in Example 4.

Then to stop the process, first the supply of air was stopped and then the supplies of water and methanol were stopped, while recording the changes in the catalyst temperature (plots Δ in FIG. 5).

EXAMPLE 7

Present Invention

Using the same test apparatus as in Example 1, the reforming reaction was started and stabilized in the same procedure as in Example 4.

Then to stop the process, first the supply of air was stopped and then the S/C ratio of water and methanol being supplied continuously was changed to 4.6, while recording the changes in the catalyst temperature (plots ○ in FIG. 5).

In contrast to the case where the supplies of water, methanol and air were stopped simultaneously and the catalyst layer was cooled naturally as in Example 4, it was found that stopping the supplies of water and methanol first as in Example 2 resulted in excessive heat generation of the residual methanol and sudden rise in the catalyst layer temperature.

This is because excessive amount of air was supplied to the catalyst layer, thus causing the exothermic reaction of

What is claimed is:

1. An apparatus for feeding a fuel to a methanol reforming apparatus that generates a hydrogen-rich gas by reacting a mixed gas of water, methanol and air on a catalyst, comprising:

a first mixed water-methanol solution tank wherein the molar ratio of water/methanol is controlled to a predetermined value for use in reforming;

a second mixed water-methanol solution tank wherein the molar ratio of water/methanol is controlled to 4.6 or higher;

a switching means that switches the mixed water-methanol solution tanks is used as a fuel source according to conditions of operation of the methanol reforming apparatus;

an evaporator that generates a mixed water-methanol gas by evaporating the mixed water-methanol solution supplied from the first or second mixed water-methanol solution tank;

a condenser that recovers water from the evaporator;

a first line that supplies the mixed water-methanol solution from the first mixed water-methanol solution tank to the second mixed water-methanol solution tank;

a second line that supplies the water from the condenser to the second mixed water-methanol solution tank;

a third line that supplies the mixed water-methanol solution from the second mixed water-methanol solution tank to the evaporator; and an electronic control unit that controls the switching means so as to supply the mixed water-methanol solution from the second mixed water-methanol solution tank to the evaporator when starting and/or stopping the methanol reforming apparatus.

2. An apparatus for feeding a fuel to a methanol reforming apparatus according to claim 1, wherein the second mixed water-methanol tank is an S/C control tank in which the molar ratio of water/methanol is controlled by utilizing water in the methanol reforming apparatus.

3. An apparatus for feeding a fuel to a methanol reforming apparatus according to claim 2, further comprising: a condenser which recovers water generated in the methanol reforming apparatus, wherein the S/C control tank prepares a mixed water-methanol solution from the mixed water-methanol solution tank supplied from the first mixed water-methanol solution tank and the recovered water from the condenser.

4. An apparatus for feeding a fuel to a methanol reforming apparatus according to claim 3, wherein the condenser recovers at least one of water generated in a fuel cell and water generated in the methanol reforming apparatus.

5. An apparatus for feeding a fuel to a methanol reforming apparatus according to claim 1, further comprising: an electronic control unit which controls the amounts to be introduced so that the molar ratio of water/methanol is 4.6 or higher and/or the molar ratio of air/methanol is 1.5 or lower.

6. An apparatus for feeding a fuel to a methanol reforming apparatus according to claim 5, wherein the electronic control unit controls introducing the mixed water/methanol gas simultaneously with or after the introduction of air.

7. An apparatus for feeding a fuel to a methanol reforming apparatus according to claim 5, further comprising: an $O_2$ sensor installed at the inlet of the catalyst, wherein the electronic control unit controls the amounts to be introduced so that the molar ratio of water/methanol falls within a range of 1.0–2.0 at a time when the concentration of air at the inlet of the catalyst has decreased to 50% by mole or lower.

8. An apparatus for feeding a fuel to a methanol reforming apparatus according to claim 1, further comprising an electronic control unit, wherein when the operation of the methanol reforming apparatus is stopped, the electronic control unit stops the introduction of air, changes the molar ratio of water/methanol to a value higher than that of a normal operation, and stops the introduction of water and methanol.

9. An apparatus for feeding a fuel to a methanol reforming apparatus according to claim 8, wherein the molar ratio of water/methanol is set to 4.6 or higher.

10. An apparatus for feeding a fuel to a methanol reforming apparatus according to claim 1, further comprising: an electronic control unit; and a temperature sensor installed inside of the catalyst, wherein when the operation of the methanol reforming apparatus is stopped, the electronic control unit stops the introduction of air to thereby lower the catalyst temperature through a steam reforming reaction, stops the introduction of water and methanol while the catalyst is still hotter than 100° C., and adjusts the methanol concentration to 18% by mole or lower.

11. An apparatus for feeding a fuel to a methanol reforming apparatus according to claim 10, wherein the electronic control unit reintroduces air after bringing the methanol concentration to 18% by mole or lower, and then evaporates and removes remaining water and methanol by means of the oxidation heat of the catalyst.

12. An apparatus for feeding a fuel to a methanol reforming apparatus according to claim 10, wherein the electronic control unit introduces air at a temperature of 100° C. or lower after removing water and methanol by evaporation, and then cools down the catalyst and purges the gas.

* * * * *